F. R. HANCOCK AND R. F. HOFFMAN.
STEERING WHEEL.
APPLICATION FILED MAY 11, 1917. RENEWED MAY 1, 1920.
1,347,156.
Patented July 20, 1920.
2 SHEETS—SHEET 1.
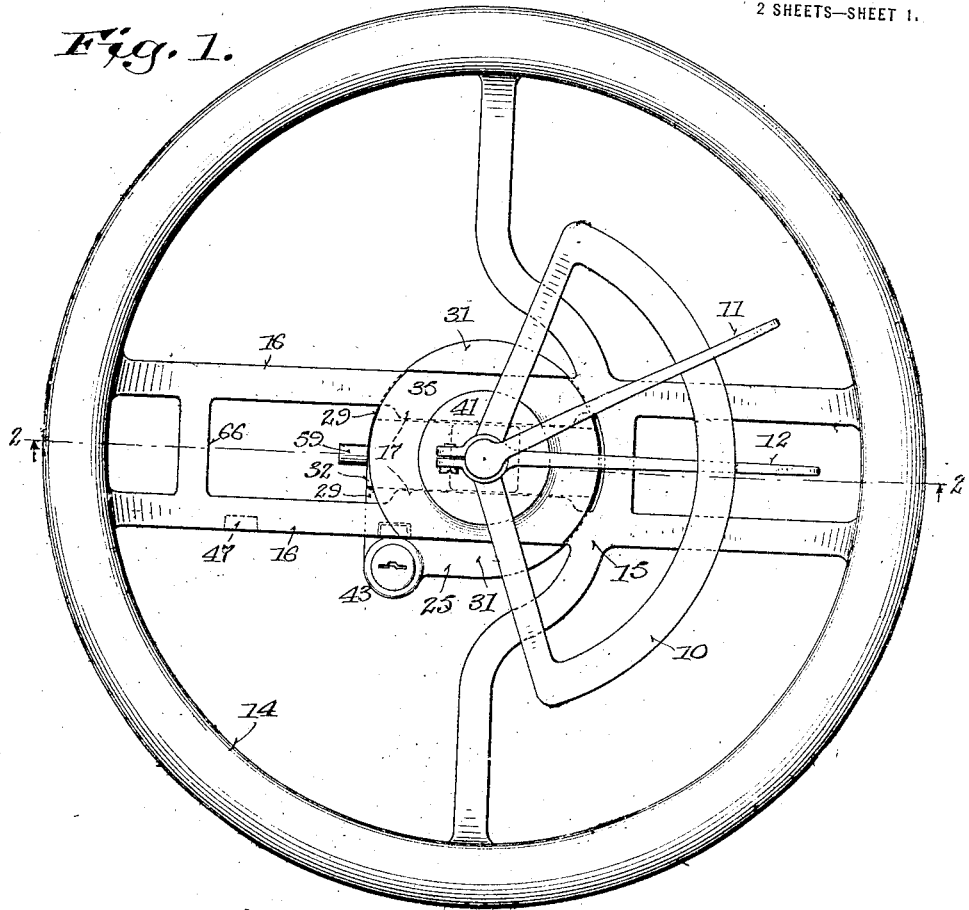
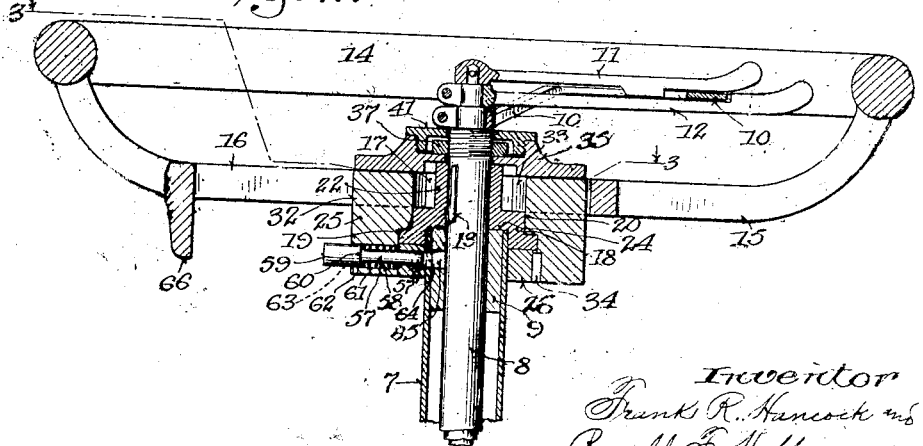

F. R. HANCOCK AND R. F. HOFFMAN.
STEERING WHEEL.
APPLICATION FILED MAY 11, 1917. RENEWED MAY 1, 1920.
1,347,156.
Patented July 20, 1920.
2 SHEETS—SHEET 2.
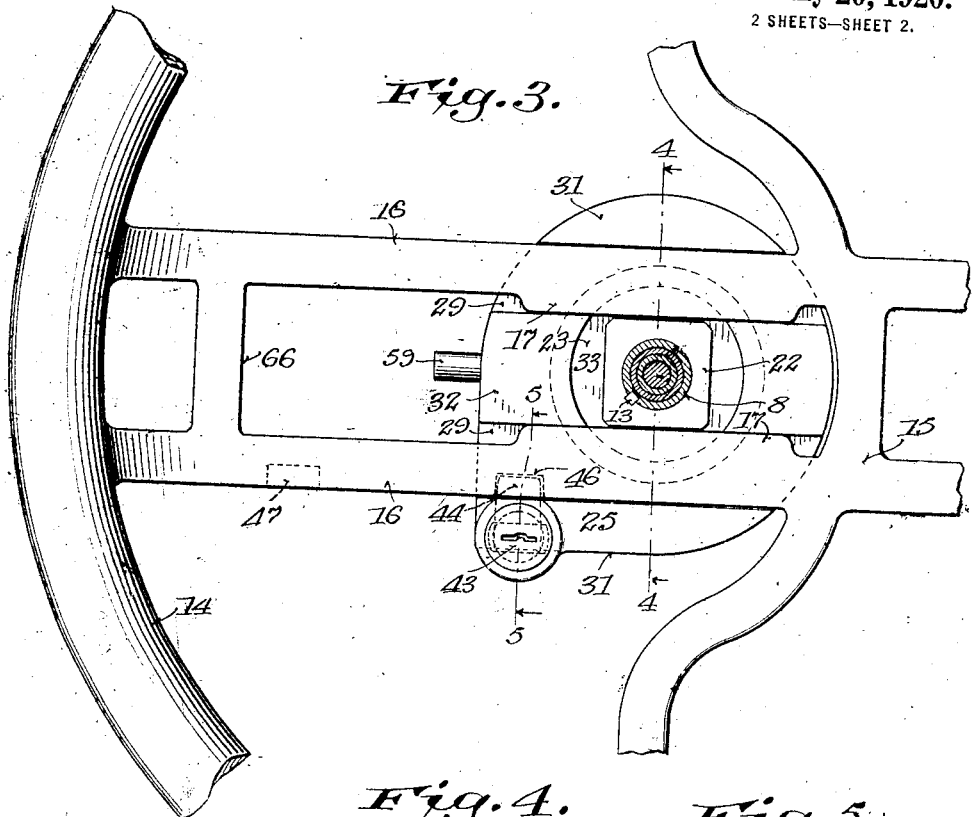
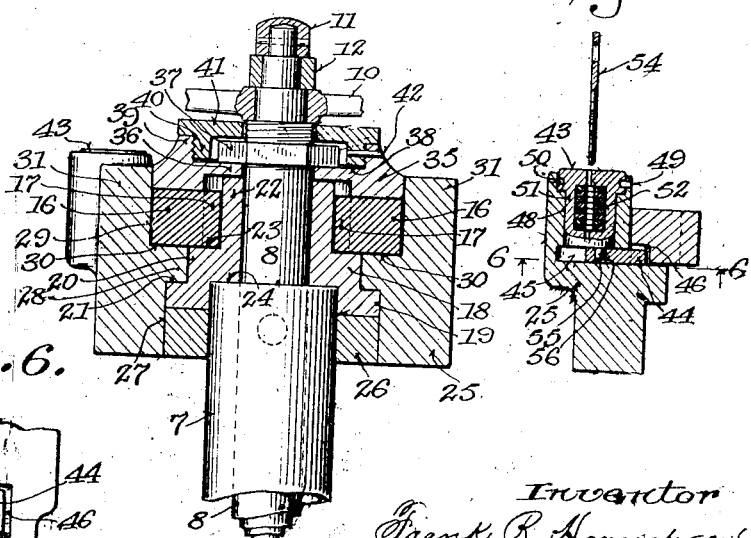
Inventor
Frank R. Hancock and
Ronald F. Hoffman.
By Morsell, Keeney & French
Attorneys.

UNITED STATES PATENT OFFICE.

FRANK R. HANCOCK AND RONALD F. HOFFMAN, OF KENOSHA, WISCONSIN.

STEERING-WHEEL.

1,347,156.  Specification of Letters Patent.   Patented July 20, 1920.

Application filed May 11, 1917, Serial No. 168,011. Renewed May 1, 1920. Serial No. 378,263.

*To all whom it may concern:*

Be it known that we, FRANK R. HANCOCK and RONALD F. HOFFMAN, citizens of the United States, and residents of Kenosha, in the county of Kenosha and State of Wisconsin, have invented new and useful Improvements in Steering-Wheels, of which the following is a description, reference being had to the accompanying drawings, which are a part of this specification.

The invention relates to steering wheel locks.

The invention is more particularly designed to provide a lock for the steering wheel of an automobile to render said steering wheel inoperative to prevent surreptitious removal of the automobile.

The invention is further designed to provide a steering wheel lock in which the wheel is locked in inoperative position by sliding the wheel forwardly and locking it whereby more room is provided between the wheel and the operator's seat so that the operator may more readily get in or out of his seat.

The invention is further designed to provide a steering wheel with a double lock in which the master lock secures the wheel to the steering post standard and also to a member revolubly mounted on the steering post so that if the locking connection between the wheel and standard should become disengaged the wheel would still be inoperative as it is locked free to turn about the steering post.

The invention is further designed to provide a steering wheel slidably mounted on a member revolubly mounted on the steering post and provided with a lug adapted to engage a locking bolt which engages the steering post standard when the wheel is locked to said revoluble member.

The invention further consists in the several features hereinafter set forth.

In the drawings:

Figure 1 is a plan view of the device embodying the invention;

Fig. 2 is a section taken on the line 2—2 of Fig. 1;

Fig. 3 is a section taken on the line 3—3 of Fig. 2, parts being broken away;

Fig. 4 is a section taken on the line 4—4 of Fig. 3;

Fig. 5 is a section taken on the line 5—5 of Fig. 3;

Fig. 6 is a section taken on the line 6—6 of Fig. 5.

In the drawings, the numeral 7 represents the steering post standard, 8 the steering post, 9 the bearing for said post, 10 the quadrant member, 11 and 12 the gas and spark levers, said parts 11 and 12 being connected to the parts which they control by the usual tubes which pass through the steering post and a key 13 on the steering post all of usual construction.

The steering wheel consists of the wheel portion 14 and the spider 15. The spider 15 is of peculiar construction in that two of its arms 16 are connected together in spaced relation and have inwardly extending ribs 17 disposed centrally of the wheel for a purpose hereinafter described. A member 18 is keyed to the post 8 by the key 13 to form a part thereof and consists of a cylindrical portion 19, a reduced cylindrical portion 20, forming with the portion 19 a shoulder 21, and rectangular nut portion 22 reduced from the portion 20 to form a shoulder 23. The member 18 also has a cylindrical recess 24 in its bottom into which the upper end of the standard 8 fits.

Mounted on the member 18 is a revoluble locking member, forming the hub of the wheel, and which consists of two parts 25 and 26. The part 25 consists of a ring having a cylindrical bore 27 the upper portion of which fits the portion 19, an inwardly extending annular flange 28 which rests upon the shoulder 23 and fits the portion 20 of the member 18 and slots 29 offset from the flange 28 to form shoulders 30 and said portions 31 and 32 and recesses 33 adjacent the nut portion 22, Fig. 4. The sides of the nut portion 22 and the shoulders 23, the shoulders 30 with the sides 31 forming the slots 29 form guide channels in which the arms 16 are slidably mounted. The part 26 consists of a ring revolubly mounted on the post standard 7 and seated within the bore 27 of the part 25 and secured thereto by a tight fit and a key 34, the upper surface of said ring abutting against the under side of the member 18. The parts 25 and 26 are thus secured together and are free to revolve on the member 18.

The steering wheel is secured against vertical movement by a member 35 forming in effect a part of the hub and having inwardly extending annular flanges 36 revolubly mounted upon the post 8 and resting upon the top of the nut portion 22, and a nut 37 mounted on the threaded upper end of the post 8 and engaging said member. Access to this nut is prevented by inclosing the same in the recessed portion 38 of the member 35, the sides 39 of which are threaded to receive the depending threaded annular flange 40 on a circular cap 41 which is also secured to said member by a pin 42. As portions of the member 35 project over the arms 16 above the guide channels, previously described, and the member 35 is held by the nut 37 against vertical movement, the arms 16 and consequently the wheel is prevented from being moved upwardly.

The means for locking the wheel to prevent operation comprises means for locking the arms of the wheel to the revoluble locking member and also means for locking the revoluble member to the steering post standard.

The means for locking the arms of the wheel to the revoluble locking member comprises a lock 43 set into a portion of the part 25 and is designed to actuate a locking bolt 44 which is slidably mounted in a longitudinal recess 45 in said part 25 and adapted to project into recesses 46 and 47 in one of the arms 16 of the wheel. The lock may be of any suitable construction but we prefer to use a cylindrical tumbler lock, as shown in Figs. 3, 5 and 6, which is set into a vertical recess 48 in the part 25 and secured therein by means of a pin 49 in the part 25 engaging with an annular groove 50 in the lock cylinder 51, said cylinder being held in locked position by the tumblers 52 which are adapted to be moved into locking recesses 53 in said part 25 on the withdrawal of the key 54. The locking bolt 44 is operatively connected to the lock cylinder 51 by a pin 55 on said cylinder movably mounted within a slot 56 in said locking bolt, the insertion of the key moving the tumblers 52 out of locking engagement with the recesses 53 whereby on the turning of the key with the cylinder 51 the locking bolt 44 is withdrawn from locking engagement with the recesses in the arm. As the ribs 17 on the arms 16 are adapted to engage opposite sides of the nut portion 22 when the locking bolt 44 is in the recess 46, the wheel will be locked to its hub and to the member 18 so the turning of the wheel will turn the steering post to operate the steering mechanism. When the locking bolt 44 is withdrawn from the recess 46 and the wheel with its arms is pushed forwardly and the locking bolt 44 is locked into the recess 47 in one of the arms 16 then said wheel will be locked to its hub but as said hub is free to turn on the member 18 and as the nut portion 22 thereof now assumes a position beyond the ribs 17 and is spaced away from said arms, the wheel will simply spin on the member 18 and be inoperative to turn the steering post 8.

The means for locking the revoluble member of the hub to the steering post standard comprises a locking bolt 57 slidably mounted in a bore 58 in the part 25 and in a bore 57' of smaller diameter than the bore 58 in the part 26, said bolt having an enlarged end portion 59 forming a shoulder 60 and a spring 61 being interposed between said shoulder 60 and the ring 26 to normally project the end of the bolt beyond the hub, outward movement of said bolt being limited by a pin 62 carried by the bolt and moving in a slot 63 in the part 59 below the bore 58. The steering post standard 7 and the bearing 9 are provided with alined apertures 64 and 65 which are in line with the bore 57' so that the bolt 57 may be moved inwardly to lock the hub to the steering post standard. The bolt 57 is moved inwardly and retained in locked position by the locking means previously described and a lug 66 mounted on the wheel which engages the outer end of the bolt and moves it inwardly into the apertures 64 and 65 and retains it in this position when the arms 16 are locked to the hub by the locking bolt 44 engaging in the recess 47.

With this construction when the owner of the automobile desires to operate it, the steering wheel is moved so that the ribs 17 engage the nut portion 22 of the member 18 and the locking bolt 44 registers with the recess 46 in the arm 16 of the wheel and on the locking of the bolt within said recess the wheel including the hub member formed of the parts 25 and 26 is connected to the member 18 and consequently the steering post 8 for operating it. Now if it is desired to render the steering wheel inoperative, the locking bolt 44 is moved out of the recess 46 and the wheel with its arms 16 is slid forwardly within the recesses in the hub until the locking bolt 44 registers with the recess 47 in the arm 16 to which it is locked by the turning in of the bolt and the withdrawal of the key and at the same time the bolt 57 having been moved into locking engagement with the steering post standard 7 on the outward movement of the wheel, the wheel is locked to the hub and to the steering post and is out of engagement with the nut portion 22 so that the steering post cannot be turned nor can any access to the nut 37 be had because of the hood formed by the member 35 and cap 41 surrounding the same. If for any reason the bolt 57 should be disengaged from locking engagement with the steering post still the wheel could not be turned to operate the vehicle as under these conditions it would be locked to the hub which is free to turn on the member 18. In some instances we may omit the locking bolt 57 with its associated parts and simply use the locking means for securing the spider to the hub and steering post in operative position and for securing said spider to the hub so that the wheel is free to spin or turn about the post without operating the same.

It will be further noted that when the wheel is locked in inoperative position it is spaced away from the driver's seat so as to permit ready access thereto which is an important consideration in some types of automobiles where the steering post is close to the driver's seat.

We are aware that the details of construction herein shown and described are subject to some modification and change and such variations in construction as come within the scope of the appended claims we deem to be within the spirit of our invention.

What we claim as our invention is:

1. In a steering wheel lock, the combination, with the steering post, of a steering wheel including a spider, a hub member freely revolubly mounted on said post and on which said spider is slidably mounted, a driving connection between the spider and the post when said spider is in one position with respect to the post, and inclosed key controlled means for directly locking the spider to the hub when said spider is in or out of driving engagement with the post.

2. In a steering wheel lock, the combination, with the steering post standard and the steering post, a hub member freely revolubly mounted on the steering post, a steering wheel including a spider slidably mounted on the hub member, a driving connection between the spider and the steering post when said spider is in one position with respect to the hub, means for locking the spider to the hub when said spider is in or out of driving connection with said post, and means for locking the hub to the steering post standard when the spider is locked in inoperative position.

3. In a steering wheel lock, the combination, with the steering post standard and the steering post, of a hub member freely revolubly mounted on the steering post, a steering wheel including a spider slidably mounted on said hub member, a driving connection between the spider and the steering post when said spider is in one position with respect to the hub, means for locking the spider to the hub when said spider is in or out of driving engagement with the post, a locking member carried by the hub and engageable with the steering post standard, and means for moving said locking member into engagement with said steering post standard when said steering wheel is secured to the hub in inoperative position.

4. In a steering wheel lock, the combination, with the steering post, of a hub member freely revolubly mounted on said post, a steering wheel including a spider movably mounted in the hub, means including a nut for securing said wheel against vertical movement, means for preventing access to said nut, a driving connection between the spider and the post when said spider is in one position with respect to said post, and means for locking the spider to the hub when said spider is in or out of driving connection with the post.

5. In a steering wheel lock, the combination, with the steering post standard and the steering post, of a driving member secured to the steering post, a member revolubly mounted with respect to said post and driving member and having a horizontally extending guideway therein, a steering wheel including a spider slidably mounted in said guideway and adapted to be moved into and out of driving engagement with said driving member, means for locking the spider to said revoluble member when said spider is in or out of driving engagement with said driving member, and means for locking said revoluble member to the steering post when said spider is locked in inoperative position.

6. In a steering wheel lock, the combination, with the steering post standard and the steering post, of a driving member secured to the steering post, a member revolubly mounted with respect to said post and driving member, a steering wheel including a spider slidably mounted in the revoluble member and adapted to be moved into and out of driving engagement with said driving member, means for locking the spider to the revoluble member when said spider is in or out of driving engagement with said driving member, a locking bolt carried by the revoluble member and engageable with the steering post standard, and a lug on the spider for moving said locking bolt into locking engagement with said steering post standard when said spider is locked in out of driving engagement position with said driving member.

7. In a steering wheel lock, the combination, with the steering post, of a hub member freely revolubly mounted upon said post, a steering wheel including a spider slidably mounted upon the hub member, a driving connection between said spider and said post when said post is disposed centrally of the spider, inclosed key controlled means for directly locking the spider to the hub when said spider is in driving connection with the post and for directly locking said spider out of driving engagement position when the spider is moved laterally of said hub member.

8. In a steering wheel lock the combination, with the steering post of a hub member mounted thereon and having a horizontally extending guideway therein, a steering wheel including a spider slidably mounted in said guideway, a key controlled locking bolt disposed within said hub member, said spider having spaced apart notches therein to receive said bolt to lock said spider to said hub member in either of two positions, said bolt being completely inclosed and concealed by said hub member and spider.

9. In a steering wheel lock, the combination with the steering post, of a driving member secured thereto, another member freely revolubly mounted on said driving member, said members having recesses therein forming spaced apart horizontally extending guideways, a steering wheel including a spider having spaced apart arms slidably mounted in said guideways and engageable with said driving member in one position, a member fitting over said driving member, a nut for securing said last named member against vertical movement, a cap secured to said last named member to prevent access to said nut, and means for locking the spider to the hub when said spider is in or out of driving engagement with said driving member.

In testimony whereof we affix our signatures.

FRANK R. HANCOCK.
RONALD F. HOFFMAN.